C. J. Fay,
Hay Press.
No. 318.
Reissued July 17, 1855.
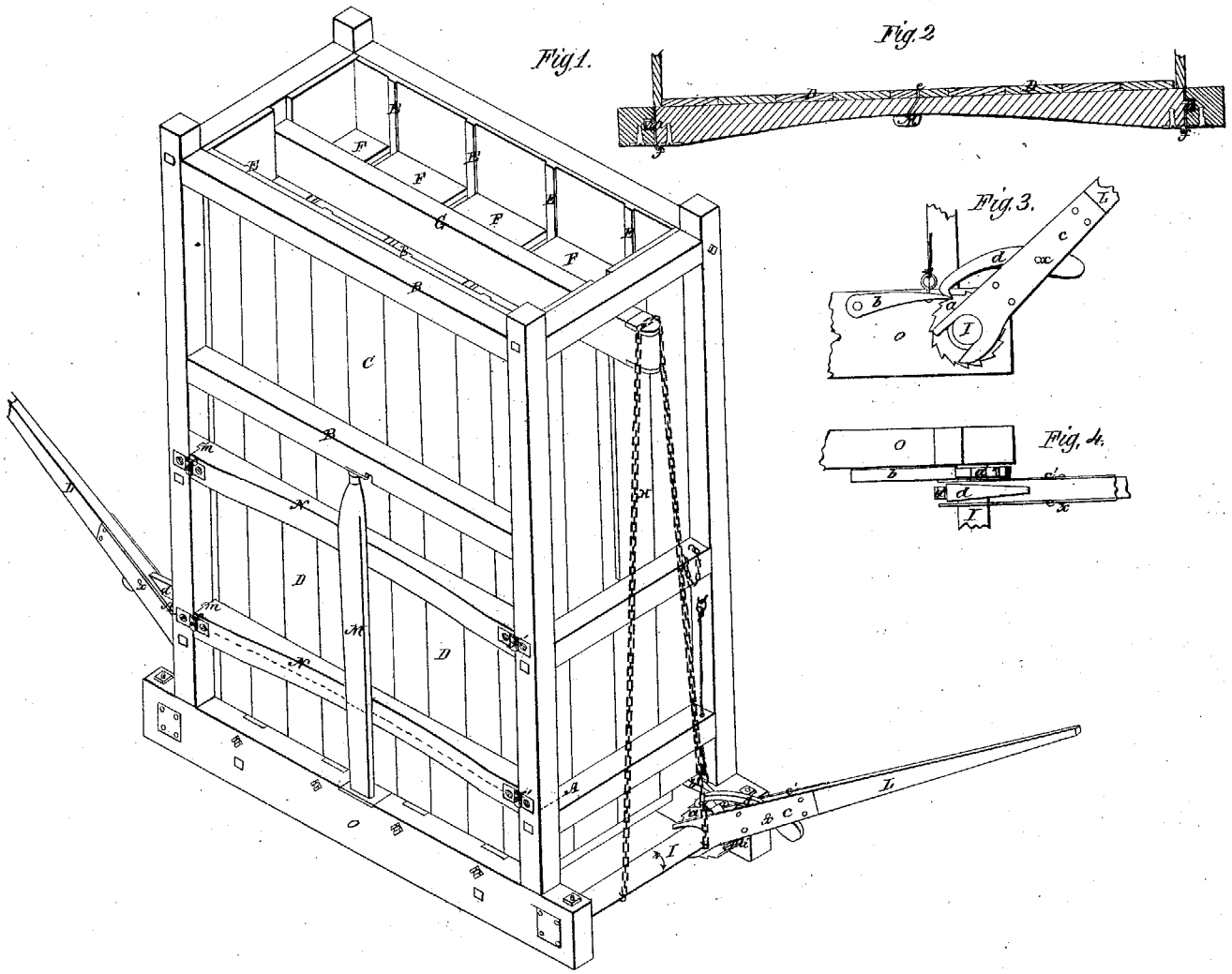
AM. PHOTO-LITHO. CO. N.Y. (OSBORNE'S PROCESS)

UNITED STATES PATENT OFFICE.

C. J. FAY, OF NORTH LINCOLN, MAINE.

IMPROVEMENT IN COTTON-PRESSES.

Specification forming part of Letters Patent No. 10,472, dated January 31, 1854; Reissue No. 318, dated July 17, 1855.

*To all whom it may concern:*

Be it known that I, CYRUS J. FAY, of North Lincoln, in the county of Penobscot and State of Maine, have invented sundry new and useful Improvements in Hay, Cider, and Cotton Presses; and I hereby declare the following to be a full, clear, and exact description of the same, reference being had to the annexed drawings, making part of this specification.

Figure 1 is an isometrical view of the press; Fig. 2, a section through the doors upon the line A of Fig. 1; Fig. 3, a detached view of the hand-levers for working the press; Fig. 4, a plan of the same.

In presses of this character, as heretofore constructed, the follower has been made of two thicknesses of plank secured together in one solid piece, and was exceedingly heavy requiring the united strength of several men to manage it, the bottom thickness of planks being placed transversely at a suitable distance apart to allow the straps or ropes with which the material was to be secured to be passed through the spaces between them, the upper plank, which was placed longitudinally, being secured firmly to them for the purpose of maintaining them in their places, otherwise they would be liable to be forced together as they descended, and there would be no space left between them through which to pass the straps.

To obviate this difficulty and to enable me to use separate planks of small size without the danger of their crowding together is the object of my first improvement. This I accomplish by placing guides upon the interior of the box of the press, between which guides the follower-planks descend, the guides keeping them constantly the required distance apart.

My second improvement consists in causing a tenon upon the cross-bars of the doors of the press to enter mortises in the frame-work of the press when the doors are closed, that the strain may be taken off the hinges when the press is in operation.

My third improvement consists in placing the hinges of the doors upon the outside of the cross-bars and permitting the doors to bind upon each other, on their inner surface, for the purpose of preventing the doors from springing or flying open when the bar which confines them is removed, and thus endangering the operatives and destroying the hinges of the doors.

To enable others skilled in the art to make and use my invention, I will proceed to describe its construction and operation.

B is the frame-work of the press; C the interior boxing of the same.

D are the doors, which are closed while the material is being pressed and opened when it is to be taken from the press. E are vertical cleats upon the inside of the press, between which are placed the sections F of the follower. These sections are thus kept separate by the cleats E, and the spaces between them necessary for the passage of the straps which are to confine the bale, are preserved. This sectional follower may be easily managed by a boy. If, however, the sections were all secured together by an additional plank, the weight would be so great that the strength of two men would be required to manage it. Upon the top of the follower rests the press-beam G, over the ends of which pass the chains H, which are secured to the shaft I, upon one end of which are secured two ratchet-wheels, *a* and *a'*. Upon the latter rests the retaining-pawl *b*, and by means of the former the shaft I is made to revolve in the following manner.

L is a lever, upon the end of which are two side plates, *c c'*, of the form represented in Figs. 3 and 4.

*d* is the operating-dog, which is pivoted to the lever L at the point X. This lever is placed over the ratchet-wheel *a* in such a manner that the side plates, *c c'*, shall pass, one upon each side of the ratchet-wheel, into the teeth of which the hook of the dog *d* engages. By depressing this lever the shaft I is made to revolve in the direction of the arrow, the shaft being prevented from returning, when the lever is again raised, by the pawl *b*. It is evident that by working this lever the press-beam is made to descend. The doors D are secured in a closed position by the upright bar M. The foot of this bar passes into a mortise in the sill O, and the top under a catch in one of the cross-timbers of the press. In presses of this description, as heretofore constructed, when the bar which confined the doors was removed, the latter flew violently open, tearing off the hinges, and oftentimes injuring those standing by. To obviate this invenience, I have hinged my doors at the points *f f'*, and when closed they bear against each at other at the point *e* of Fig. 2. As this point is far within the line joining the points *f* and *f'*, it is evident that the doors will not be easily forced open. They are therefore held closed after the bar M is removed until they are relieved by the attendants, and suffered gradually to open. Upon the ends of the cross-timbers of the doors are tenons *m*, which enter mortises in the frame-work of the press, and thus the hinges are relieved from the strain which would otherwise come upon them.

What I claim as new, and desire to secure by Letters Patent, is—

1. The use of the slats or guide-strips E, arranged and operating in the manner substantially as set forth.

2. The tenons upon the transverse bars of the doors, which, entering mortises in the frame-work, relieve the hinges from the strain which would otherwise come upon them.

3. Hinging the doors of the press in the manner herein described, to prevent them from violently bursting open when the bar which confines them is removed.

C. J. FAY.

Witnesses:
SAM. COOPER,
JOHN S. CLOW.